United States Patent [19]

Smith et al.

[11] 4,016,350
[45] Apr. 5, 1977

[54] REDUCTION OF VINYL CHLORIDE IN FREE SPACE SURROUNDING POLYVINYL CHLORIDE POWDER

[75] Inventors: Edwin Studley Smith, Cuyahoga Falls; Richard A. Marshall, Akron, both of Ohio

[73] Assignee: The Goodyear Tire & Rubber Company, Akron, Ohio

[22] Filed: Nov. 20, 1975

[21] Appl. No.: 633,736

[52] U.S. Cl. .......................... 528/486; 260/45.7 S; 260/45.85 H; 528/487
[51] Int. Cl.² .................................................. C08F 6/00
[58] Field of Search ............... 260/79.5 NV, 45.7 S, 260/45.85 H; 528/486, 487

[56] References Cited

UNITED STATES PATENTS

| | | | |
|---|---|---|---|
| 2,050,843 | 8/1936 | Jacobsohn | 106/22 |
| 2,482,048 | 9/1949 | Williams | 260/92.8 |
| 2,534,936 | 12/1950 | Walter | 260/45.7 |
| 3,655,618 | 4/1972 | Weil | 260/470 P |

*Primary Examiner*—Stanford M. Levin
*Attorney, Agent, or Firm*—F. W. Brunner; J. M. Wallace, Jr.

[57] ABSTRACT

The invention relates to the reduction of the amount of vinyl chloride monomer in the free space surrounding polyvinyl chloride powder by incorporating in the powder a material which will react with vinyl chloride monomer and allowing it to react with and reduce the amount of vinyl chloride monomer present.

6 Claims, No Drawings

REDUCTION OF VINYL CHLORIDE IN FREE SPACE SURROUNDING POLYVINYL CHLORIDE POWDER

This invention relates to a method for reducing the amount of unreacted or monomeric vinyl chloride in the air space associated with polyvinyl chloride particles after polymerization. Polyvinyl chloride is normally prepared in the form of small particles. These particles retain some monomeric vinyl chloride and this is true whether or not the polymer is prepared by emulsion, suspension or by bulk polymerization. The unreacted vinyl chloride in the polyvinyl chloride particles slowly diffuses from these particles into the atmosphere in the container in which the particles are stored. The result is a buildup of vinyl chloride monomer in the free space of the storage container to relatively high levels. This, of course, is undesirable since it is thought that vinyl chloride may induce undesirable effects on people who have to work with polyvinyl chloride. Thus in order to increase the safety in handling and in storing such resins it is desirable to reduce the amount of unreacted chloride released from the polyvinyl chloride particles.

Now it has been found that the free vinyl chloride monomer content of bulk polyvinyl chloride can be reduced by mixing polyvinyl chloride in particle form with a material which reacts with monomeric vinyl chloride, and the vinyl chloride monomer in the free space around the particles is greatly reduced by the same treatment.

The reaction of the monomeric vinyl chloride may be brought about by storing the bulk polyvinyl chloride in the presence of a monomeric vinyl chloride reactive material or by coating the particles of polyvinyl chloride powder with a material which reacts with vinyl chloride monomer as it diffuses from the polymer particles, thus preventing release of the monomer into the free space of the container or area wherein the polyvinyl chloride is stored. The resin particles may be coated by mixing polyvinyl chloride powder with a solution containing the vinyl chloride reactive material and then removing the solvent, or in the case wherein the vinyl chloride reactive material is a low melting compound it may be melted and mixed with polyvinyl chloride at a temperature above its melting point and then the mixture is cooled to solidify the reactive material. This latter procedure is easily accomplished by mixing the powder and the reacting material in a rotary mixer at 50° to 60° C. under a pressure of 160 millimeters of mercury pressure. Encapsulation of the polyvinyl chloride particle has been found to be particularly effective because the particle is coated and the coating reacts with the vinyl chloride monomer as it diffuses to the surface, thus preventing release of the vinyl chloride into the free space around the bulk polymer.

The following examples illustrate the invention. Parts and percentages are by weight unless otherwise indicated. In the examples below the words "Ether Solution" indicate that the vinyl chloride reactive material was dissolved in ether, the ether solution mixed with the vinyl chloride particles and the ether removed by evaporation. This procedure would result in encapsulation of the polymer particles. The word "Melt" indicates that the vinyl chloride reactive material was melted and mixed with the polyvinyl chloride particles and the mixture cooled. The vinyl chloride monomer contents of the sample and free space within the containers were determined after sufficient time to come to equilibrium before and after treatment, showing that the vinyl chloride monomer content in the free space was much reduced by the treatment.

TABLE I (*See footnote for abbreviations)

| Reagents | p-TsOH | Thiomalic Acid | ODTG | ODMP | ODMP | ODMP |
|---|---|---|---|---|---|---|
| Parts used per 100 PVC | 0.4 | 0.4 | 1.0 | 1.0 | 1.0 | 1.0 |
| Treatment - Added as | Ether Solution | Ether Solution | Melt | Melt | Melt | Ether Solution |
| Resin VC Content Before Treatment | | | | | | |
| ppm × 10⁻³ | .220 | .220 | 2.40 | 2.40 | 0.061 | 0.70 |
| Free Space, ppm × 10⁻³ | — | — | — | — | 0.355 | 3.09 |
| Residual Resin VC Content After Treatment | | | | | | |
| Control, ppm × 10⁻³ | .170 | .170 | .130 | .130 | 0.038 | 0.28 |
| Sample, ppm × 10⁻³ | — | — | .830 | .270 | 0.017 | 0.028 |
| Reduction, % | — | — | (538) | (108) | 55 | 90 |
| Residual Free Space VC Content After Treatment | | | | | | |
| Control, ppm × 10⁻³ | 1.00 | 1.00 | 20.6 | 20.6 | 0.180 | 0.528 |
| Sample, ppm × 10⁻³ | 0.28 | 0.30 | 5.6 | 0.8 | 0.007 | 0.010 |
| Reduction, % | 72 | 70 | 73 | 96 | 96 | 99.8 |

*Control is resin sample without the reagent, carried through the process.
VC - Monomeric vinyl chloride
p-TsOH - p-Toluene sulfonic acid
PVC - Polyvinyl chloride
ODTG - Octadecyl thioglycolate
ODMP - Octadecyl 3-mercaptopropionate While certain representative embodiments and details have been shown for the purpose of illustrating the invention it will be apparent to those skilled in this art that various changes and modifications may be made therein without departing from the spirit or scope of the invention.

What we claim is:

1. The method of reducing the monomeric vinyl chloride in the free space surrounding polyvinyl chloride resin powder which comprises mixing polyvinyl chloride powder with 0.4 or more parts per 100 parts of said polyvinyl chloride powder of a reactive material selected from the group consisting of p-toluenesulfonic acid, octadecyl thioglycolate and octadecyl 3-mercaptopropionate.

2. The method of claim 1 in which the vinyl chloride reactive material is in molten state.

3. The method of claim 1 in which the polyvinyl chloride powder is mixed with a solution of the vinyl chloride reactive material.

4. The method of claim 1 in which a polyvinyl chloride powder is encapsulated in a vinyl chloride reactive material.

5. The method of claim 1 in which the polyvinyl chloride powder is stored in the presence of the vinyl chloride reactive material.

6. The method of claim 1 in which the vinyl chloride reactive material is octadecyl 3-mercaptopropionate.

* * * * *